Patented Jan. 10, 1939

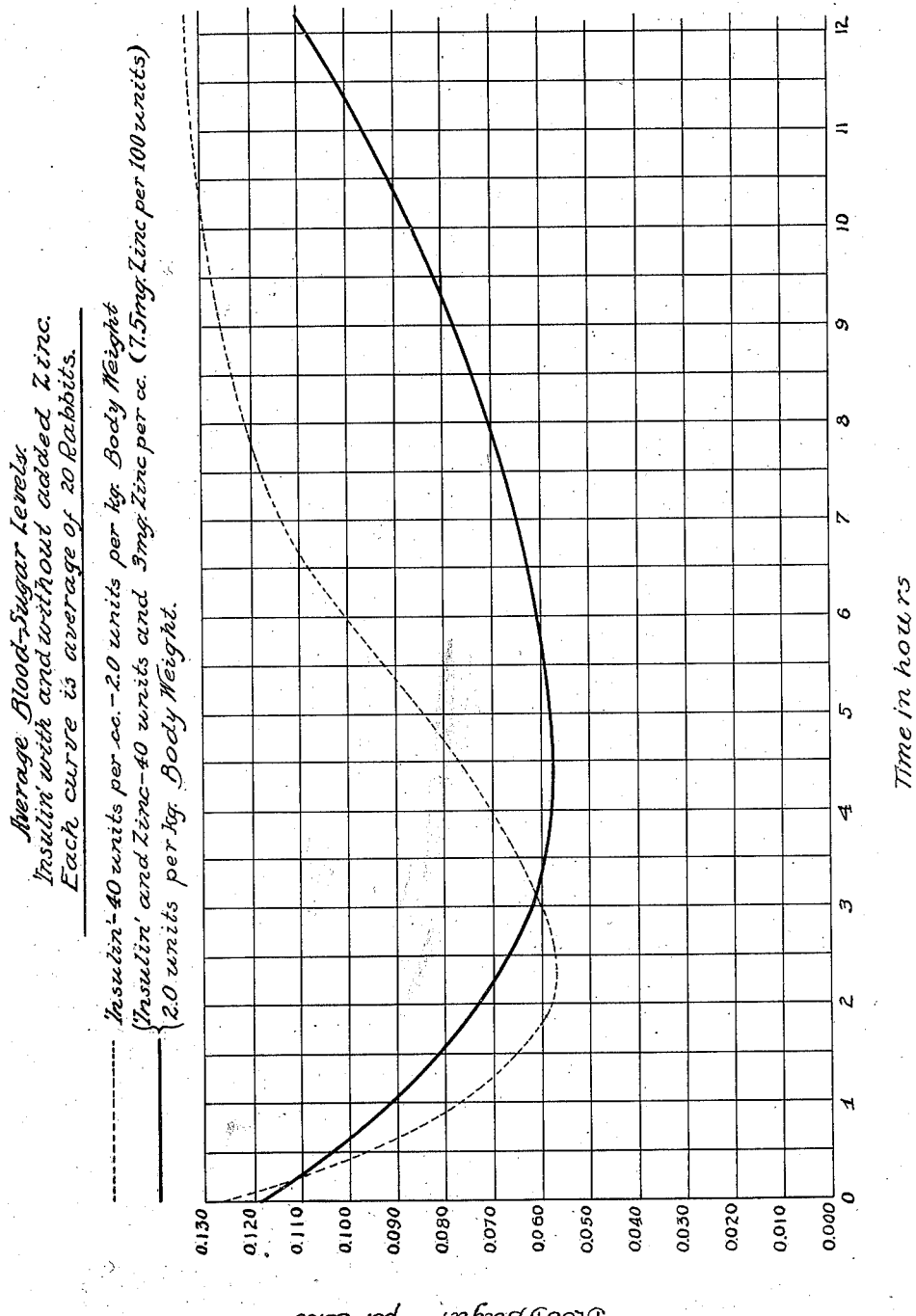

2,143,591

UNITED STATES PATENT OFFICE 2,143,591

THERAPEUTIC PREPARATION AND PROCESS OF MAKING AND USING IT

David Alymer Scott, Forest Hill, Ontario, and Albert Madden Fisher, Toronto, Ontario, Canada, assignors to The Governors of the University of Toronto, Toronto, Ontario, Canada Application September 26, 1936, Serial No. 102,794

2 Claims. (Cl. 167—75)

It is the object of our invention to effect prolongation of the blood-sugar-lowering action of 'Insulin'; and to make such action more nearly uniform over a considerable period of time, and to obtain a more effective utilization of 'Insulin'.

We do this by subcutaneously administering with the 'Insulin' an amount of zinc much greater in proportion to the 'Insulin' than that found in crystals of 'Insulin' obtained with zinc.

It is known (Delezenne, 1919; Lutz, 1926; Scott and Fisher, 1935) that zinc exists in the pancreas. One of us (Scott) has discovered that the co-presence with 'Insulin' of certain metals is necessary for obtaining crystals of 'Insulin' with certainty and high yields; and his application Serial No. 102,795, filed September 26, 1936, is based on that discovery. Among such metals is zinc.

However, the amount of zinc in crystals of 'Insulin' obtained with zinc (which crystals we shall for convenience refer to as zinc crystals of 'Insulin') does not exceed about 0.5% of the dry weight of the 'Insulin'; and with only such a percentage of zinc co-present with it, 'Insulin' has substantially its usual and familiar blood-sugar-lowering action. In that usual and familiar action, in rabbits for instance, there is a fairly sharp peak effect of the 'Insulin', in the lowering of blood-sugar levels, usually within a half hour to two and a half hours after subcutaneous administration of the 'Insulin'; and the greater part of the effect usually disappears within about five to eight hours after the injection.

We have discovered that by having a much greater amount of zinc present with 'Insulin', the action of the 'Insulin' when subcutaneously administered is modified so that the period of lowering of blood-sugar levels is markedly prolonged, generally with a less sharp peak effect and a greater total effect.

The desired amount of zinc may be provided in any convenient manner, as by adding, to the 'Insulin', zinc in metallic form, or in the form of any suitable compound, such as zinc chloride, zinc acetate, zinc sulphate, or zinc oxide; and we intend to include any suitable zinc compounds when we speak of adding zinc. Sufficient zinc may be obtained by a sufficiently long contact of 'Insulin' solutions with vessels or equipment made of or containing zinc. Also, the zinc may be simply added to any solid preparation of 'Insulin' so that it goes into solution when a solution of the 'Insulin' is made.

We administer with 'Insulin' an amount of zinc which in proportion to the dry weight of the 'Insulin' is many times greater than the approximately 0.5% found in zinc crystals of 'Insulin'. That is what we mean by administering excess zinc. To produce the desired prolongation of 'Insulin' action, the amount of zinc in proportion to 'Insulin' may be varied within wide limits, and varies from one species of animal to another; but we have found it convenient that it be between 25% and 500% of the dry weight of the 'Insulin'. A very effective amount of zinc is an amount somewhat in excess of the dry weight of the 'Insulin', or between 100% and 200% thereof.

When we speak of dry weight of 'Insulin', we mean to refer either to crystals of 'Insulin' (which contain about 22 units per mg.) or to dry amorphous commercial preparations of 'Insulin' (which usually contain from about 10 to about 22 units per mg.). In the comparisons illustrated by the curves of the accompanying drawing, we have for convenience used a preparation of 'Insulin' which contains about 20 units per mg. in its dry amorphous form.

The comparative blood-sugar-lowering effects of a solution containing 'Insulin' and excess zinc, and of an ordinary solution of 'Insulin', as subcutaneously administered to rabbits, are illustrated in the accompanying drawing. The single figure of such drawing is a diagram showing two curves, in dotted and full lines respectively; which show the average blood-sugar values of two similar groups, of twenty rabbits each, over a period of twelve hours following subcutaneous injection of an ordinary solution of 'Insulin' (dotted-line curve) and of a solution containing 'Insulin' and excess zinc (full-line curve). In each of these solutions the concentration of 'Insulin' was 40 units (about 2 mg.) per cc; and in the second the concentration of zinc was about 3 mg. per cc, or 7.5 mg. per 100 units of 'Insulin'.

When the injection was of the ordinary solution of 'Insulin' (two units per kilogram of body weight of the rabbit), as indicated by the dotted-line curve the level of average blood-sugar values dropped from a normal of about 0.120% to a value of about 0.057% in about two hours, and then rose fairly rapidly until at the end of about seven hours it had returned almost to normal.

In contrast to this was the effect, shown by the full-line curve, of the injection of an 'Insulin' solution containing excess zinc—two units of 'Insulin' per kilogram of body weight of the rabbit as before but with about 7.5 mg. of zinc present per 100 units of 'Insulin'. The level of average blood-sugar values dropped much more slowly following the injection, and did not reach its minimum until about five hours after the injection. After that minimum was reached, the level rose at a relatively slow rate, so that at the end of seven hours it had risen to only about 0.065%, and at the end of ten hours only to about 0.086%.

In using a solution containing 'Insulin' and excess zinc, in accordance with our invention, it is desirable for many reasons that the solution have a hydrogen ion concentration on the acid side of the isoelectric point of 'Insulin', which is around pH 4.8 to pH 5.5. We have gotten excellent results at pH 2.5 to pH 3.5.

We are not sure what if any chemical or physical combination takes place between the 'Insulin' and the zinc. Whether or not any such combination occurs, physiological action such as we have outlined is attained.

Our solution containing 'Insulin' and excess zinc not only produces a prolonged effect upon subcutaneous or intramuscular injection, but also produces a greater metabolism of sugar per unit of 'Insulin', with a less sharp peak effect; which is clear from the curves of the diagram. As a result, larger doses of it may be administered, the number of doses per day may be reduced, and the total daily requirement of 'Insulin' is usually decreased.

We claim as our invention:

1. A therapeutic preparation, comprising 'Insulin' mixed with an amount of zinc which is between 25% and 500% of the dry weight of the 'Insulin'.

2. A therapeutic preparation, comprising 'Insulin' mixed with zinc in an amount in excess of the dry weight of the 'Insulin'.

DAVID ALYMER SCOTT.
ALBERT MADDEN FISHER.